US009377529B2

(12) United States Patent
Lieven

(10) Patent No.: US 9,377,529 B2
(45) Date of Patent: Jun. 28, 2016

(54) ON-BOARD METEOROLOGICAL RADAR HAVING A ROTATING ANTENNA

(71) Applicant: Airbus Operations (SAS), Toulouse (FR)

(72) Inventor: Patrick Lieven, Fronton (FR)

(73) Assignee: Airbus Operations (SAS), Toulouse (FR)

( * ) Notice: Subject to any disclaimer, the term of this patent is extended or adjusted under 35 U.S.C. 154(b) by 261 days.

(21) Appl. No.: 14/252,209

(22) Filed: Apr. 14, 2014

(65) Prior Publication Data

US 2014/0361924 A1 Dec. 11, 2014

(30) Foreign Application Priority Data

Apr. 16, 2013 (FR) ...................................... 13 53446

(51) Int. Cl.
*G01S 13/95* (2006.01)
*G01S 13/88* (2006.01)
*H01Q 3/02* (2006.01)
(Continued)

(52) U.S. Cl.
CPC ............. *G01S 13/953* (2013.01); *G01S 13/882* (2013.01); *H01Q 1/281* (2013.01); *H01Q 3/02* (2013.01); *H01Q 3/04* (2013.01); *H01Q 19/17* (2013.01);
(Continued)

(58) Field of Classification Search
CPC ................ G01S 13/953; G01S 13/882; G01S 2007/027; G01S 13/426; G01S 13/95; G01S 7/03; H01Q 19/19; H01Q 19/17; H01Q 3/04; H01Q 1/281; H01Q 3/02

USPC ........................ 342/26 R, 26 B, 74–75, 78, 81
See application file for complete search history.

(56) References Cited

U.S. PATENT DOCUMENTS

| 3,903,523 A | 9/1975 | Hartley |
| 4,080,579 A | 3/1978 | Fassett |

(Continued)

FOREIGN PATENT DOCUMENTS

FR 3004586 A1 * 10/2014 ............ G01S 13/882

OTHER PUBLICATIONS

Hildebrand, P.H., et al.: "The Eldora/Astraia Airborne Doppler Weather Radar: Goals, Design, and First Field Tests", Proceedings of the IEEE, IEEE. New York, US, vol. 82, No. 12, Dec. 1, 1994, pp. 1873-1890, XP000492726.

(Continued)

*Primary Examiner* — John B Sotomayor
(74) *Attorney, Agent, or Firm* — Greer, Burns & Crain Ltd.

(57) ABSTRACT

A meteorological radar installed on board an aircraft, including a mechanical support fixed to a bulkhead of a nose of the aircraft, wherein an antenna is mounted on the mechanical support to enable turning mobility around an axis of rotation. The antenna includes a pedestal, on which at least one blade, extending radially along the axis of rotation, is installed. A free side of the blade, along which a plurality of radiating elements is distributed, perceptibly has the shape of a portion of conic in a plane including the axis of rotation. Because the blade is mobile only in rotation along the axis of rotation, and the selection of the emission/reception direction is performed electronically, not mechanically, the space and length requirements of the meteorological radar are fixed, whether the meteorological radar is in operation or not, and are determined based on the eccentricity and parameter of the conic.

8 Claims, 5 Drawing Sheets

(51) Int. Cl.
    *H01Q 1/28*     (2006.01)
    *H01Q 3/04*     (2006.01)
    *H01Q 19/17*    (2006.01)
    *H01Q 19/19*    (2006.01)
    *G01S 7/02*     (2006.01)

(52) U.S. Cl.
    CPC .......... *H01Q 19/19* (2013.01); *G01S 2007/027* (2013.01)

(56) References Cited

U.S. PATENT DOCUMENTS

| | | | | |
|---|---|---|---|---|
| 5,247,303 A | * | 9/1993 | Cornelius | G01S 13/20 342/26 D |
| 7,528,613 B1 | * | 5/2009 | Thompson | G01S 13/953 324/637 |
| 7,671,785 B1 | * | 3/2010 | Walker | G01S 7/024 342/26 D |
| 7,719,458 B1 | * | 5/2010 | Walker | G01S 7/024 342/26 D |
| 2011/0285582 A1 | * | 11/2011 | Zhang | G01S 7/024 342/26 R |
| 2014/0361924 A1 | * | 12/2014 | Lieven | G01S 13/882 342/26 B |
| 2015/0204973 A1 | * | 7/2015 | Nohara | G01S 13/426 342/107 |

OTHER PUBLICATIONS

French Search Report, Oct. 25, 2013.

* cited by examiner

ON-BOARD METEOROLOGICAL RADAR HAVING A ROTATING ANTENNA

CROSS-REFERENCES TO RELATED APPLICATIONS

This application claims the benefit of the French patent application No. 20131353446 filed on Apr. 16, 2013, the entire disclosures of which are incorporated herein by way of reference.

BACKGROUND OF THE INVENTION

The present invention relates to a meteorological radar installed on board an aircraft.

With reference to FIG. 1, an on-board meteorological radar 1 in the nose 4 of an aircraft includes, as known in the art, an antenna 2 fixed to a mechanism 3, as well as electronic means (not illustrated on FIG. 1) of forming a radar beam.

The mechanism 3 is fixed to a bulkhead 5 dividing a non-pressurized zone 6 from a pressurized zone 7 of the fuselage 8. The antenna 2 and the mechanism 3 are fitted in the non-pressurized zone 6, between a radome 10, forming the forward extremity of the fuselage 8, and the bulkhead 5. The electronic means are, for their part, fitted in the pressurized zone 7.

The antenna 2 includes a panel capable of emitting and receiving radar waves in the zone situated forward of the aircraft. To that effect, the mechanism 3 provides rotation of the panel around the yaw axis OZ as well as around the pitch axis OY of the aircraft.

Due to the rotation of the panel around two axes, this type of meteorological radar presents, in utilization, a significant spatial requirement that can be likened to the volume of a sphere. Thus, in order to accommodate the meteorological radar 1 and allow it to function in the non-pressurized zone 6, the shape of the radome 10 of an aircraft equipped with such a meteorological radar 1 is generally of a hemispherical type with dimensions imposed by the space needed for the installation and functioning of the meteorological radar 1.

This is detrimental to the pursuit of an optimum aerodynamic profile of the aircraft, since with a radome of a hemispherical type, the separation of the boundary layer of the air takes place at a distance very close to the forward extremity of the fuselage 8 of the aircraft, and the aerodynamic drag is thereby augmented, hence increasing the fuel consumption.

SUMMARY OF THE INVENTION

The aim of the present invention is consequently to propose an on-board meteorological radar having a lower space requirement, both for its installation and during its functioning, than that of the meteorological radars known in the prior art.

To that effect, the object of the invention is a meteorological radar intended to be installed on board an aircraft, incorporating an antenna and a mechanical support as well as an electronic scanning system, the antenna including a pedestal, rotationally mounted relative to the mechanical support around an axis OX, called axis of rotation, wherein at least one blade is fixed to the pedestal and extends radially along the axis of rotation, a plurality of radiating elements being distributed along a side of the blade not contiguous to the pedestal, called free side, the free side perceptibly having the shape of a portion of a conic with a focal axis merged with the axis of rotation in a plane including the axis of rotation, each radiating element being capable of radiating along an axis included in the plane and being connected to the electronic scanning system.

BRIEF DESCRIPTION OF THE DRAWINGS

Other characteristics and advantages of the invention will emerge on reading preferred embodiments of the invention with reference to the attached figures, among which.

In all of these figures, identical references designate identical or similar elements.

DETAILED DESCRIPTION OF THE PREFERRED EMBODIMENTS

Figure 2:
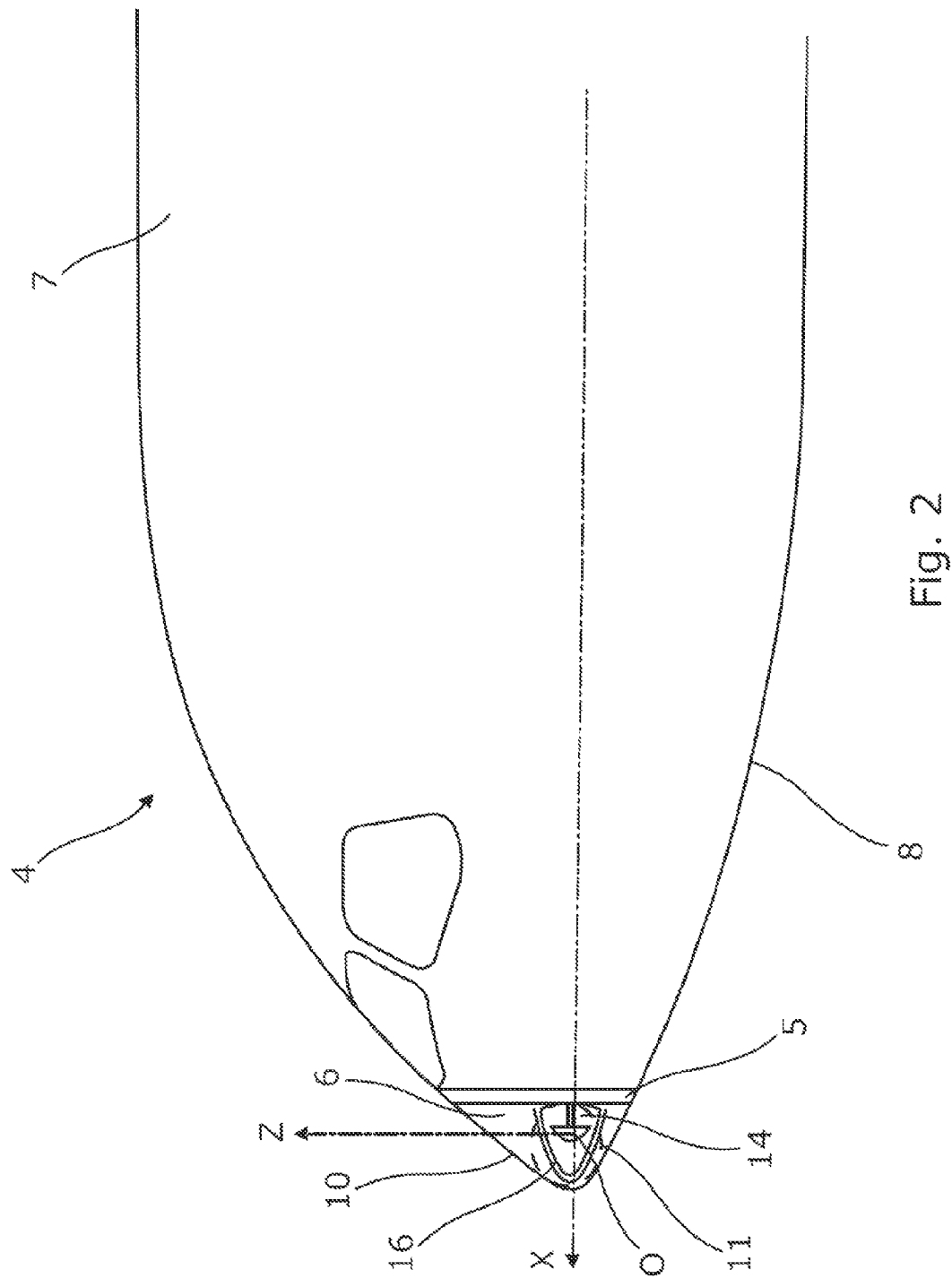
FIG. 2 diagrammatically represents the installation in the nose of an aircraft of an on-board meteorological radar of the invention.
Figure 3:
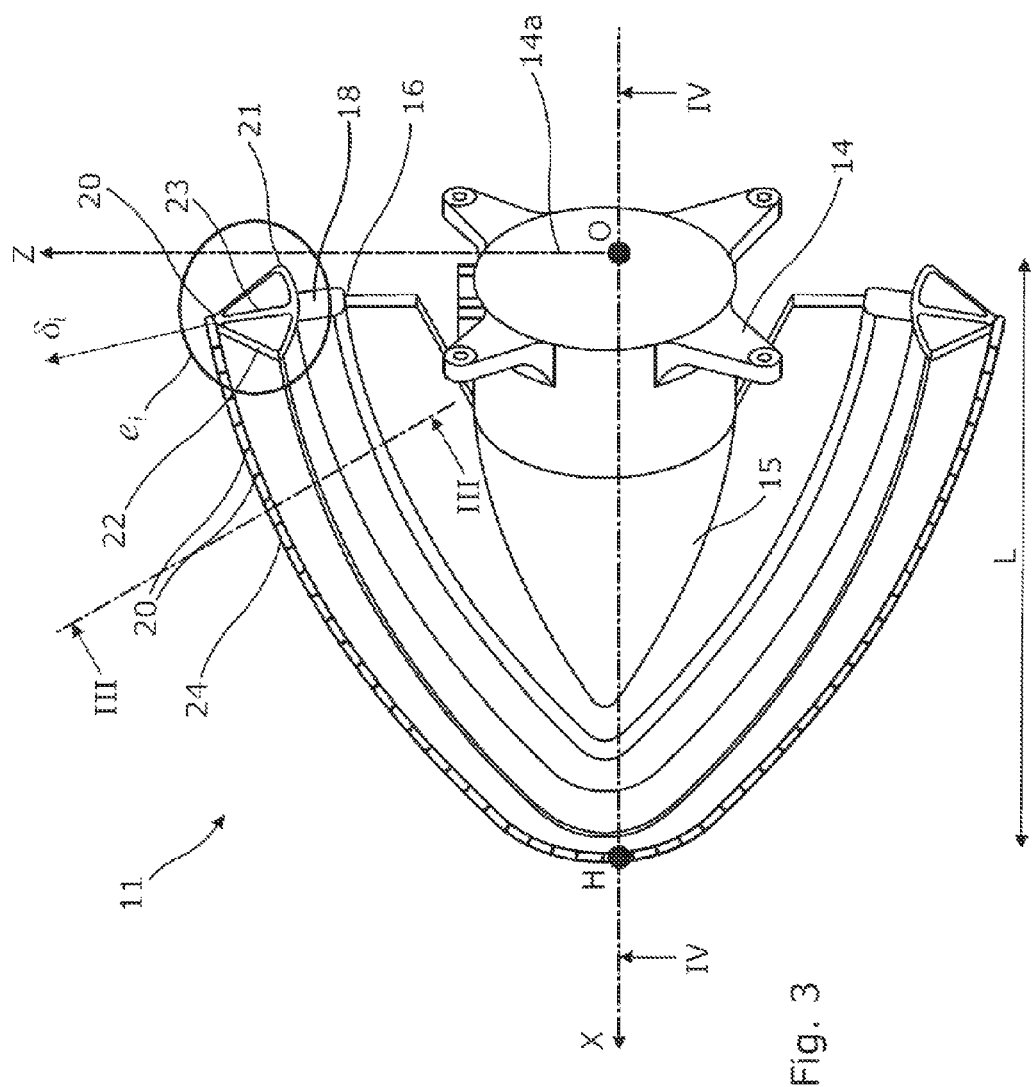
FIG. 3 is a perspective view of the meteorological radar represented in FIG. 2.

FIGS. 2 and 3 represent the meteorological radar 11 intended to be installed in the nose 4 of an aircraft. As known in the prior art, the bulkhead 5, perceptibly flat, divides a non-pressurized zone 7 from a pressurized zone 6 of the fuselage 8. The meteorological radar 11 is thus installed in the non-pressurized zone 6, between the radome 10, permeable to radar waves, which forms the forward extremity of the fuselage 8, and the bulkhead 5.

The meteorological radar 11 according to an embodiment of the invention includes an antenna rotationally mounted around a longitudinal axis OX of the aircraft at a mechanical support 14. The meteorological radar 11 also includes an electronic scanning system 30,31,32,33 (see FIG. 5).

The mechanical support 14, which permits the rotation of the antenna around the axis OX, is fixed, through a side 14a perceptibly flat, to the bulkhead 5.

The antenna includes a pedestal 15 associated with a blade 16 provided with a plurality M of radiating elements $e_i$ where i=1, . . . , M. The pedestal 15 is mounted free to rotate around the axis OX on the mechanical support 14.

It will be noted that the pedestal 15 has, for example, in a plane including the axis OX, a perceptibly cone shape whose base is fixed to the mechanical support 14.

The electronic scanning system is installed inside the pedestal 15.

Seen as a cutaway in a plane perpendicular to the axis OX, the blade 16 has a perceptibly parallelepiped shape, with a side, called contact side, in contact with a generatrix of the pedestal 15. The side of the blade that is not contiguous to the pedestal 15, that is to say the side opposed to the contact side, is called free side 18 of the blade. According to this same cutaway, we define a plane Δ passing through the center of the free side 18 and including the axis OX.

The free side 18 of the blade 16, in the plane Δ, perceptibly has the shape of a portion of conic, with center O, and whose focal axis is merged with OX. The pedestal 15 and the mechanical support 14 are fitted on the concave side of the conic. The radiating elements $e_i$ are fitted as illustrated on FIG. 3, along the free side 18, in line with the axis OX.

In this instance, conic may be defined as a parabola, a hyperbola, or an ellipse, and by extension a circle. The conic is defined by the following equation, in polar coordinates $(\rho,\theta)$:

$$\rho = \frac{p}{1 + e \cdot \cos\theta} \quad (1)$$

where $\rho$ is the parameter of the conic (distance from the center O to the directrice), e is the eccentricity, $\theta$ being the angle formed by a point of the conic on the axis OX.

It will be noted that the blade has, for example, in a plane including the axis OX, a symmetrical shape in relation to the axis OX.

The blade 16 intersects the axis of rotation OX at a point H, thereby defining one extremity of the meteorological radar 11. Along the axis OX, the length L of the radar is defined as being the distance between this extremity H and a point on the side 14a of the mechanical support 14. The length L of the radar is notably dependent on the eccentricity and on the parameter of the conic.

Figure 4:
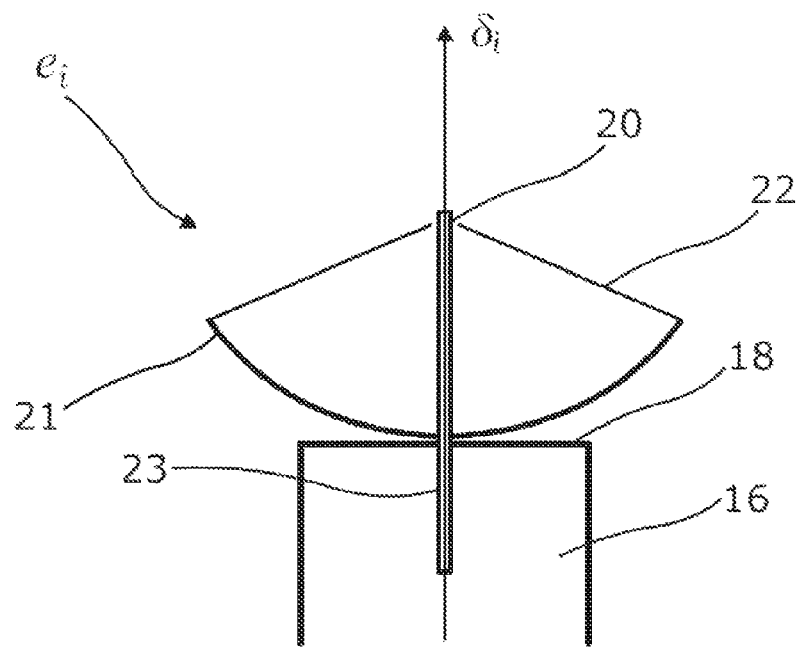
FIG. 4 is a cutaway view along the line III-III of FIG. 3, illustrating a radiating element of the meteorological radar according to an embodiment of the invention.

Each radiating element $e_i$, represented in FIG. 4, includes a wire part 20 and a symmetrical parabolic reflector 21 having a focal axis $\delta_i$ where i=1, ..., M. Each wire part 20 is aligned along the focal axis $\delta_i$ of the associated parabolic reflector 21, and is situated at the center of the latter. Each wire part 20 is linked with the parabolic reflector 21 with which it is associated by means, for example, of dielectric ties 22.

Each one of the parabolic reflectors 21 is fixed to the free side 18 of the blade at its summit such that its focal axis $\delta_i$ is perpendicular to a tangent to the free side 18. The implementation point of each radiating element $e_i$ on the free side 18 is defined as the projection on the free side 18 of the focal axis $\delta_i$ of the parabolic reflector 21 associated with the radiating element.

The implementation point of a radiating element $e_i$ thus forms an angle $\theta_i$ with the axis OX.

Each wire part 20 is furthermore linked with a waveguide 23 passing through the parabolic reflector 21 with which it is associated, at the summit of this latter. The waveguide 23 is fitted in passages made in the blade 16, and is connected to the electronic scanning system.

The different centers of the parabolic reflectors are points of a focal line situated in the plane Δ. The focal line is parallel at every point to the free side 18 of the blade 16. The focal axis $\delta_i$ of a parabolic reflector 21 is included in the plane Δ and is perpendicular to the focal line.

It will be noticed that, as illustrated in FIG. 3, a common part is used to form the parabolic reflectors 21 of the radiating elements $e_i$. This common part, presenting a symmetrical parabolic section in a plane perpendicular to the axis OX, is fixed to the free side 18 of the blade 16. Each wire part 20 is linked with this common part, for example, by dielectric ties 22. Furthermore, as in the example of FIG. 3, the wire parts 20 of the radiating elements are mechanically linked together by means, for example, of dielectric ties 24. The dielectric ties 24 also allow the wire parts to be isolated from each other; thereby rendering each radiating element $e_i$ discrete.

Each radiating element $e_i$ presents a radiation diagram, including a main lobe pointing along the axis $\delta_i$ and directed towards the exterior of the conic. In this instance, axis directed towards the exterior of the conic may be defined as an axis starting from the concave side and going towards the convex side of the conic.

Radar beam scanning of the zone situated ahead of the aircraft is achieved both by the rotation of the pedestal 15 around a single axis, the axis of rotation OX, and by the emission/reception of radar waves in the plane Δ. To that effect, each of the radiating elements $e_i$ is configured, on one hand, to emit a radar wave generated by the electronic scanning system 30,31,32,33 (see FIG. 5), and on the other, to receive a radar wave that will be processed by the electronic scanning system.

Figure 5:
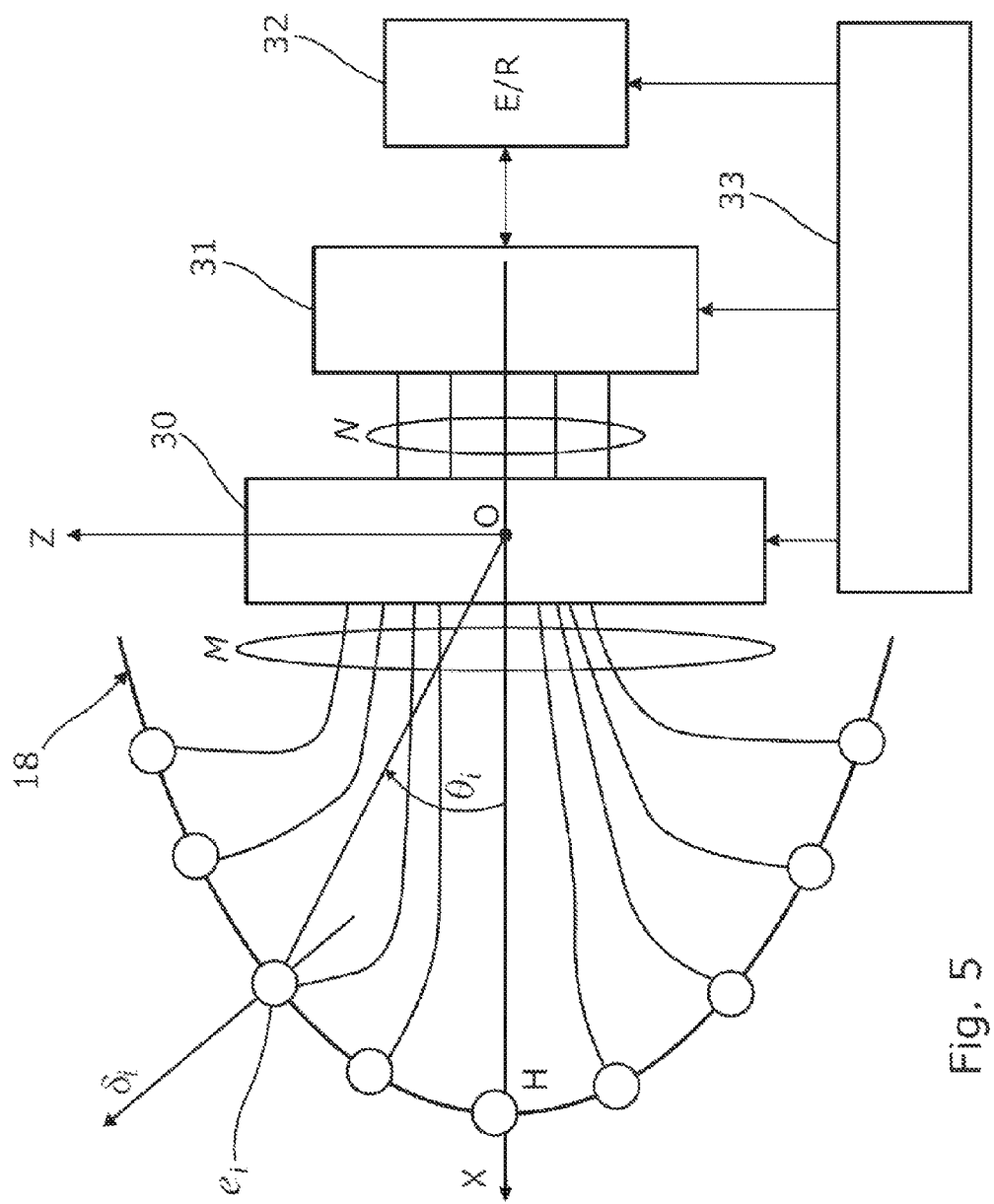
FIG. 5 is a cutaway view along the line IV-IV of FIG. 3.

The electronic scanning system includes a commutator 30, a beam former 31, an emission/reception module 32 and a control module 33 as illustrated in FIG. 5.

The control module 33, which is, for example, a computer of the microcontroller type, controls the emission/reception module 32, the beam former 31, and the commutator 30 to set in operation electronic scanning by a radar wave beam of the zone situated in the convex part of the conic, that is to say, ahead of the aircraft.

The M radiating elements $e_i$ are connected, by means of the commutator 30, by groups of N, where N≤M, adjacent elements, to the beam former 31, itself linked with the emission/reception module 32.

In emission, the emission/reception module 32 is capable, for example, of transmitting to the commutator 30, a wave train at the frequency corresponding to the wavelength of the radar. In reception, the emission/reception module 32 is capable, for example, of processing a wave train received from the commutator 30.

Figure 1:
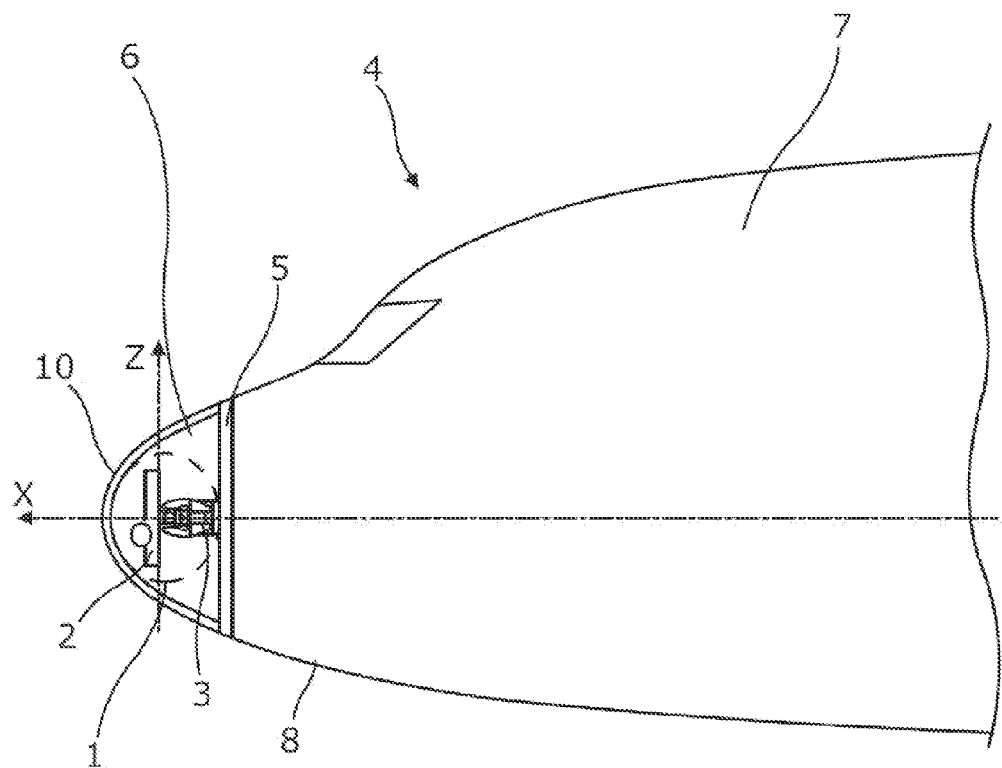
FIG. 1 diagrammatically represents the installation in the nose of an aircraft of an on-board meteorological radar known in the prior art.

In the meteorological radars of the prior art, such as described in relation to FIG. 1, the adjustment of the orientation of the direction of emission/reception of the radar waves is performed mechanically. In fact, the panel is automatically positioned by the mechanism 3, controlled by electronic means, such that the main emission lobe of the antenna 2 points above the horizon, and this is so regardless of the attitude of the aircraft. The aim is to reduce the size of the ground echo and to give a constant image of the meteorological environment of the aircraft.

In the meteorological radar according to the invention, because the antenna is rotational only along the axis OX, the adjustment of the orientation of the direction of emission/reception of the radar waves is performed electronically such that the main emission lobe of the antenna points above the horizon regardless of the attitude of the aircraft. To that effect, the control module 33 selects the radiating elements $e_i$ that should emit or receive radar waves as a function of the direction of an axis making the angle $\theta$ with the axis of rotation OX and towards which the radar waves should be emitted or received.

Thus, when a radar beam is to be emitted in the direction of an axis making the angle $\theta$ with the axis of rotation OX, the commutator 30, with M inputs and N outputs, sends a signal only to the N adjacent radiating elements $e_i$ corresponding to this direction. The sent signal is generated by the emission/reception module 32.

The selection of the N radiating elements corresponding to this direction is made by the control module 33. To that effect, the control module 33 chooses, for example, the N adjacent radiating elements $e_i$ whose angle $\theta_i$ between the axis OX and their implantation point is close to the angle $\theta$.

Beam formation is therefore achieved, for example, by means of N=4 adjacent radiating elements, for example $e_1, e_2, e_3, e_4$, for which we have an angular overlay of the main lobes for an angle $\theta$ comprised between $\theta_1$ and $\theta_4$ (where $\theta_1$ is the angle between the axis OX and the point of implantation of the radiating element $e_1$ and so on, on the free side 18, $\theta_4$ is the angle between the axis OX and the point of implantation of the radiating element $e_4$ on the free side 18).

As a variant, the selection is made by comparing the intensity of the main lobe of each of the radiating elements $e_i$ in the direction of an axis making the angle $\theta$ with the axis of rotation OX, with a predetermined minimum selection threshold.

For the N radiating elements $e_i$ selected by the commutator 30 and used by the beam former 31 for emission as well as reception in the direction of an axis making the angle $\theta$ with the axis of rotation OX, the beam former 31 applies a phase shift law $\phi(\theta)$ to the N signals to be emitted and the N signals received. Where necessary, the beam former 31 also applies to these N signals a weighting law $W(\theta)$ in order to apodize the beam. Advantageously, beam forming is performed in digital mode, by multiplying the signals by complex coefficients.

The advantage of the invention is that, in operation, the meteorological radar of the invention incorporates a part that is mobile only in rotation along the axis OX, and that the selection of the emission/reception direction is no longer performed mechanically, but electronically.

Because of this, the space requirement and the length L of the meteorological radar 11 are fixed, whether the meteorological radar is in operation or not, and are determined on the basis notably of the eccentricity and parameter of the conic.

As simulations have shown, the length L of the meteorological radar of the invention is minimal, with suitable values of $\rho$ and e, when the center of the conic is a point of a plane of the bulkhead 5 perpendicular to the axis OX.

With such a meteorological radar 11, it is possible to reduce or adapt the dimensions of the radome 10 of the aircraft in order to optimize the aerodynamic profile of the aircraft.

Another advantage of the invention is that the integration of the electronic scanning system in the pedestal 15 allows the assembly of the meteorological radar in an aircraft to be simplified. Thus, contrary to the meteorological radars of the prior art, there are no longer any turning wire connections between the antenna and the electronic scanning system.

Beyond the detection of meteorological conditions ahead of the aircraft, the meteorological radar 11 is used to obtain altitude information. In fact, the control module 33 determines, while the antenna is rotating around the axis OX, which radiating element has its axis directed vertically towards the ground and deduces the altitude of the aircraft from the return time of the signal.

According to an embodiment of the invention, the radiating elements $e_i$ are distributed along the blade with a variable spacing. The spacing is an increasing function of the distance from the wire part 20 of the radiating element $e_i$ to the axis of rotation OX. In other words, the radiating elements $e_i$ situated near the axis of rotation OX are closer to each other, while those situated further from the axis of rotation OX are more distant from each other. In different terms, the curvilinear density of the radiating elements $e_i$ is all the greater as one approaches the axis of rotation OX.

This embodiment makes it possible to obtain very good angular resolution in a central angular area around the longitudinal axis of the aircraft.

As a variant, the radiating elements $e_i$ are uniformly laid out on the free side 18 according to a constant spacing (in curvilinear distance) less than or equal to one-half the wavelength used by the meteorological radar 11.

The arrangement of the radiating elements $e_i$ according to this variant makes it possible to reduce noise during reception and emission, and to increase the angular area $\theta$ for which the angular overlay of the main lobes of the N selected adjacent elements is maximal.

According to an embodiment of the invention, the radiating elements $e_i$ can be laid out on the free side of several blades 16 having identical shapes, each blade being accommodated in a distinct plane. The planes accommodating the different blades have the axis of rotation OX as their common intersection.

The advantage of this embodiment is that it improves the regeneration rate of a radar image obtained through the meteorological radar 11.

Figure 6:
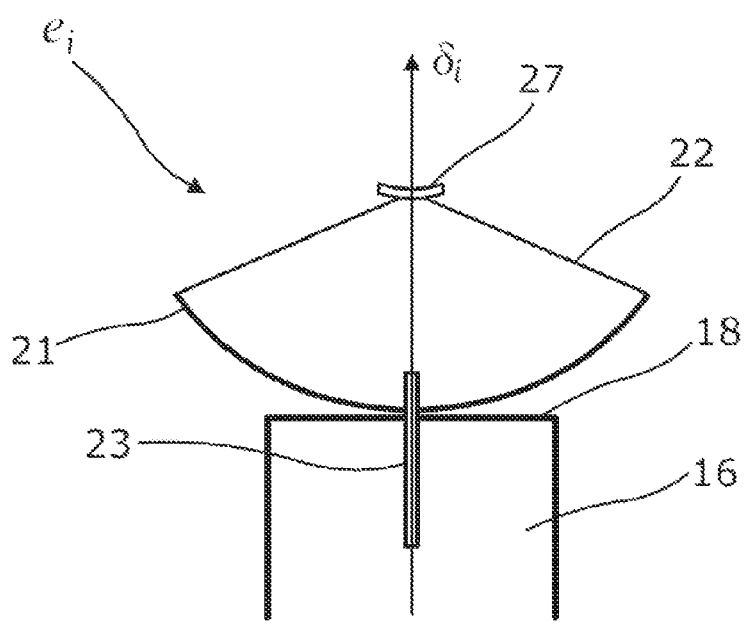
FIG. 6 is a view similar to that of FIG. 4 illustrating a radiating element of the meteorological radar according to another embodiment of the invention.

According to a variant embodiment of the invention, illustrated in FIG. 6, each radiating element includes, in place of the wire element 20, a secondary reflector 27 facing the parabolic reflector 21.

Each secondary reflector 27 is convex hyperbolic, in a plane orthogonal to the plane ($\Delta$), with a center coinciding with the center of the associated parabolic reflector 21. The center of each secondary reflector 27 is furthermore situated on the focal axis $\delta_i$ of the associated parabolic reflector 21. The summit of each of the secondary reflectors 27 is a point of the focal line.

Each secondary reflector 27 is supported, by means of ties 22, by the associated parabolic reflector 21.

A waveguide 23 is situated at the rear of each parabolic reflector 21 and runs out at the base of the latter, that is to say perceptibly at the summit of its parabolic section. The waveguide 23 is fitted in passages made in the blade 16 such that the waveguide can be connected to the electronic scanning system of the meteorological radar 11.

This embodiment makes it possible to simplify the construction of the blade 16 when a first common part is used to form the parabolic reflectors 21 of the radiating elements $e_i$ and when a second common part is used to form the secondary reflectors 27 of the radiating elements $e_i$. The second common part is supported by the first one by means of dielectric ties. In this case, it is the installation of a waveguide 23 for each radiating element $e_i$ at the rear of each parabolic reflector 21 that renders the radiating elements discrete.

Although represented in the forward part of an aircraft, the meteorological radar of the invention can also be located under the aircraft, under one of the wings or in a pod fixed to a wing of the aircraft, depending on the configuration or the needs.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A meteorological radar, to be installed on board an aircraft, comprising:
    an antenna including a pedestal, rotationally mounted relative to the mechanical support around an axis of rotation;
    a mechanical support;
    an electronic scanning system;
    at least one blade fixed to the pedestal and extending radially along the axis of rotation; and
    a plurality of radiating elements distributed along a free side of the blade not contiguous to the pedestal, the free side perceptibly having the shape of a portion of a conic with a focal axis merged with the axis of rotation in a plane including the axis of rotation, each radiating element being configured to radiate along a radiation axis included in the plane and being connected to the electronic scanning system.

2. The meteorological radar as claimed in claim 1, wherein, in utilization, the electronic scanning system is configured to transmit a radar wave only to a plurality of adjacent radiating elements fewer than all of the radiating elements.

3. The meteorological radar as claimed in claim 1, wherein each radiating element includes a parabolic reflector with a parabolic section in a plane orthogonal to the plane including the axis of rotation and fixed to the free side of the blade.

4. The meteorological radar as claimed in claim 3, wherein each radiating element includes a wire part situated at a center of the parabolic reflector and aligned along a focal axis of the parabolic reflector.

5. The meteorological radar as claimed in claim 3, wherein each radiating element furthermore includes a secondary reflector having a hyperbolic section in a plane orthogonal to the plane including the axis of rotation, the secondary reflector having a center coinciding with a center of the parabolic reflector of the radiating element.

6. The meteorological radar as claimed in claim 1, wherein the antenna includes at least two blades, wherein each blade is provided with a plurality of radiating elements and wherein the at least two blades have the axis of rotation as their common intersection.

7. The meteorological radar as claimed in claim 1, wherein the electronic scanning system is fitted in the pedestal.

8. An aircraft comprising:
a fuselage;
a radome fixed to the fuselage,
the radome defining a housing, and the fuselage including a bulkhead closing the housing; and
a meteorological radar installed in the housing and having an antenna including a pedestal, rotationally mounted relative to the mechanical support around an axis of rotation;
a mechanical support;
an electronic scanning system;
at least one blade fixed to the pedestal and extending radially along the axis of rotation; and
a plurality of radiating elements being distributed along a free side of the blade not contiguous to the pedestal, the free side perceptibly having the shape of a portion of a conic with a focal axis merged with the axis of rotation in a plane including the axis of rotation, each radiating element being capable of radiating along an axis included in the plane and being connected to the electronic scanning system,
the mechanical support being fixed to the bulkhead, and the axis of rotation of the meteorological radar being perceptibly aligned with a longitudinal axis of the aircraft.

* * * * *